(12) United States Patent
Kuwajima

(10) Patent No.: US 7,701,268 B2
(45) Date of Patent: Apr. 20, 2010

(54) CLOCK GENERATION CIRCUIT

(75) Inventor: Naoki Kuwajima, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/706,421

(22) Filed: Feb. 15, 2007

(65) Prior Publication Data
US 2007/0210849 A1    Sep. 13, 2007

(30) Foreign Application Priority Data
Feb. 20, 2006 (JP) .............................. 2006-042122
Jan. 16, 2007 (JP) .............................. 2007-006910

(51) Int. Cl.
*H03L 7/06* (2006.01)
(52) U.S. Cl. ..................... 327/156; 327/147
(58) Field of Classification Search ............. None
See application file for complete search history.

(56) References Cited

U.S. PATENT DOCUMENTS 6,178,215 B1 * 1/2001 Zhang et al. ................ 375/371
6,239,626 B1 * 5/2001 Chesavage ................... 327/99
6,798,303 B2 * 9/2004 Steinecke et al. ............. 331/78

FOREIGN PATENT DOCUMENTS

| JP | 3-226042 | 10/1991 |
| JP | 3-272234 | 12/1991 |
| JP | 6-152581 | 5/1994 |
| JP | 8-298502 | 11/1996 |
| JP | 11-308102 | 11/1999 |

* cited by examiner

*Primary Examiner*—Lincoln Donovan
*Assistant Examiner*—Daniel Rojas
(74) *Attorney, Agent, or Firm*—McGinn IP Law Group, PLLC

(57) ABSTRACT

In a second system that generates a clock signal that is synchronized with a first system, a control voltage value that controls the second oscillator such that the second system is synchronized with the first system is monitored according to the phase difference between a reference signal that is generated using the output of a first oscillator in the first system and the output of a second oscillator, whereby frequency fluctuation that occurs due to age deterioration of the first oscillator is detected.

24 Claims, 4 Drawing Sheets

CLOCK GENERATION CIRCUIT

BACKGROUND OF THE INVENTION

1. Field of the Invention

The present invention relates to a clock generation circuit having a redundant structure composed of two systems, and more particularly to the detection of frequency fluctuation caused by age deterioration of the oscillator that serves as the clock source.

2. Description of the Related Art

From the prior art, clock generation circuits have been considered that generate mutually synchronized clocks in two systems: an active system and a standby system. Such a circuit is described in, for example, JP-A-1991-272234. In this type of clock generation circuit, the active system and standby system each has a clock source, whereby the clock generation circuit generates clocks using clocks generated in one or the other system.

Highly stable oscillators are used as the clock sources of this type of clock generation circuit. Because frequency fluctuation occurs in such oscillators with the passage of time, a reference signal from an external unit such as a GPS or radio clock is typically used for constant correction.

However, in a system where the input of a reference signal from an outside source is not possible, the fluctuation in frequency that occurs with age deterioration cannot be automatically corrected. As a result, the problem exists that time and effort must be expended to detect whether fluctuation in frequency has occurred due to age deterioration in the oscillators by carrying out a frequency measurement when adjusting frequency during periodic maintenance. The problem further exists that the occurrence of fluctuation in frequency in oscillators can be checked only during periodic maintenance, and an accurate clock therefore cannot be generated until such maintenance.

SUMMARY OF THE INVENTION

It is an object of the present invention to provide a clock generation circuit in which frequency fluctuation resulting from age deterioration in an oscillator that serves as a clock source can be detected without carrying out a frequency measurement during periodic maintenance.

In the present invention, when a clock signal is generated according to the output of a first oscillator and the output of the first oscillator is used to generate a reference signal in a first system, a control voltage is determined according to the phase difference between this reference signal and the output of a second oscillator in a second system, and this control voltage is then used to control the second oscillator such that the second system is synchronized to the first system. Then, by applying this control voltage to the second oscillator, a clock signal that is synchronized to the first system is supplied as output from the second system. In the second system, the value of the control voltage that has been thus determined is monitored, and this control voltage value is used for detection of frequency fluctuation in the first oscillator.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 1:
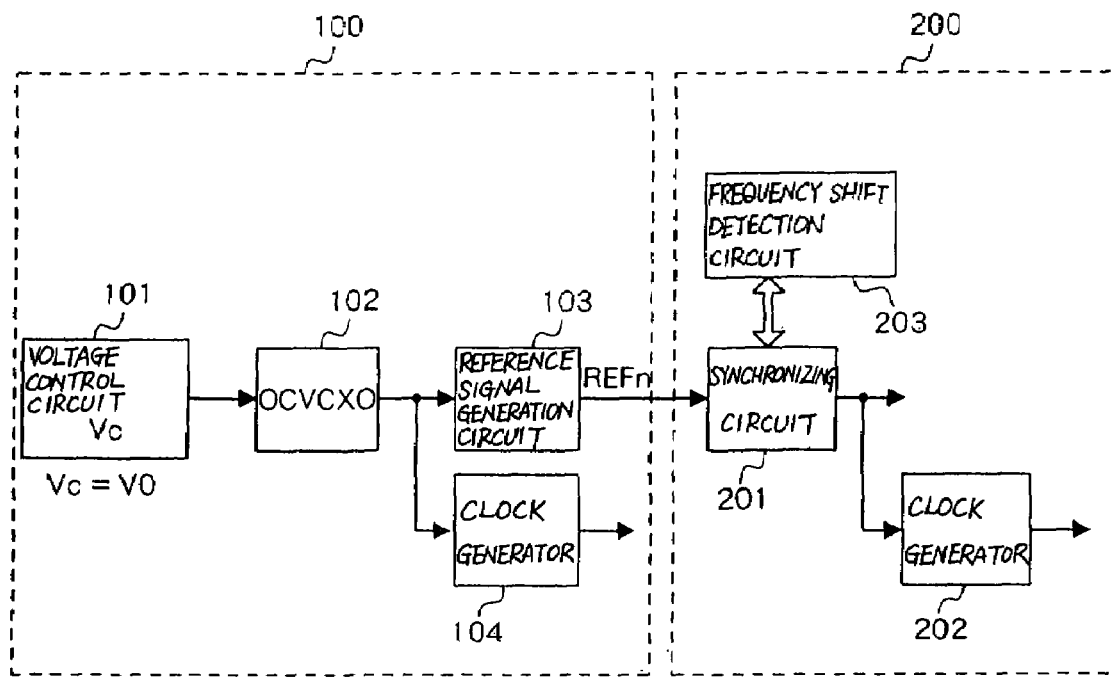
FIG. 1 shows the first embodiment of the clock generation circuit of the present invention.
Figure 2:
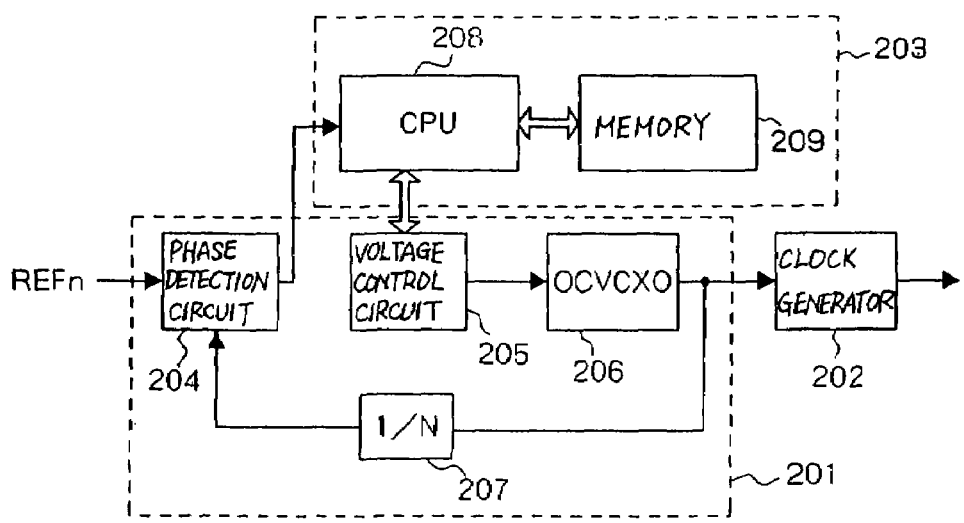
FIG. 2 shows the configuration of the standby clock generation circuit shown in FIG. 1.

FIG. 1 shows the first embodiment of the clock generation circuit of the present invention. FIG. 2 shows the details of the configuration of standby-system clock generation circuit 200 shown in FIG. 1.

The present embodiment as shown in FIG. 1 is a redundant configuration made up from: active-system clock generation circuit 100 for generating and supplying a clock signal by using as a clock source a highly stable oven-controlled voltage-controlled crystal oscillator (hereinbelow abbreviated as "OCVCXO"), which is the first oscillator; and standby-system clock generation circuit 200, which is the second system, for generating and supplying as output a clock signal synchronized to active-system clock generation circuit 100 by means of reference signal REFn generated in active-system clock generation circuit 100.

Active-system clock generation circuit 100 is made up from: voltage control circuit 101, which is the first voltage control means; OCVCXO 102; reference signal generation circuit 103; and clock generator 104, which is the first clock generation means.

Standby-system clock generation circuit 200 is composed of: synchronizing circuit 201 for establishing frequency synchronization with active-system clock generation circuit 100 based on reference signal REFn that has been generated in active-system clock generation circuit 100; frequency shift detection circuit 203 for detecting frequency fluctuation of OCVCXO 102 based on reference signal REFn that has been generated in active-system clock generation circuit 100; and clock generator 202, which is the second clock generation means.

Further, as shown in FIG. 2, synchronizing circuit 201 is composed of: phase detection circuit 204; voltage control circuit 205, which is the second voltage control means; OCVCXO 206, which is the second oscillator; and 1/N frequency divider 207; and frequency shift detection circuit 203 is composed of: CPU 208, which is the control means; and memory 209, which is the storage means.

Voltage control circuit 101. is a component for applying voltage control value Vc, which is the control voltage in OCVCXO 102; and OCVCXO 102 oscillates and supplies the clock that is frequency-controlled by voltage control value Vc applied from voltage control circuit 101. Voltage control value Vc that is applied from voltage control circuit 101 to OCVCXO 102 is normally fixed at an initial adjustment value V0.

Clock generator 104 frequency-divides the clock that is supplied from OCVCXO 102 to generate and supply a clock signal in active-system clock generation circuit 100.

Reference signal generation circuit 103 receives as input the clock supplied from OCVCXO 102, and generates and supplies reference signal REFn, which is a synchronizing signal, to standby-system clock generation circuit 200.

Phase detection circuit 204 detects the phase difference between reference signal REFn generated in active-system clock generation circuit 100 and the clock that has been supplied from OCVCXO 206 and subjected to 1/Nth frequency division in 1/N frequency divider 207.

CPU 208 both determines the control voltage that is applied to OCVCXO 206 according to the phase difference detected in phase detection circuit 204 and reports any divergence of this control voltage from a predetermined voltage range.

Voltage control circuit 205 is a component for applying the control voltage determined in CPU 208 to OCVCXO 206, and OCVCXO 206 oscillates and supplies a clock that has undergone frequency control by the control voltage applied from voltage control circuit 205.

Memory 209 stores the control voltage information used in CPU 208.

Clock generator 202 frequency-divides the clock supplied from OCVCXO 206 and generates and supplies a clock signal of the same phase, and moreover, of the same frequency as the clock signal supplied from active-system clock generation circuit 100.

Explanation next regards the operation of the clock generation circuit of the above-described configuration.

In active-system clock generation circuit 100, voltage control value Vc of voltage control circuit 101 is fixed, and the output clock frequency is therefore subject to change due to the age deterioration of OCVCXO 102, but in standby-system clock generation circuit 200, the control voltage value of OCVCXO 206 in standby-system clock generation circuit 200 is changed by voltage control circuit 205 of synchronizing circuit 201 in synchronization with changes in frequency. Here, the voltage control value applied to OCVCXO 206 that forms synchronizing circuit 201 of standby-system clock generation circuit 200 is monitored; a predetermined voltage range, for example, the voltage range of frequency stability required by the system is set; and when the voltage control value diverges from this voltage range, the divergence of the frequency of OCVCXO 102 in active-system clock generation circuit 100 from the permissible frequency range due to, for example, age deterioration, is detected, and the system notified.

Explanation next regards the details of operation.

OCVCXO 102 of active-system clock generation circuit 100 is of a configuration such that the output frequency changes according to voltage control value Vc that is applied from voltage control circuit 101, and voltage control value Vc, which is a value adjusted to the frequency required by the system, is fixed at V0 (initial adjustment value).

Figure 3:
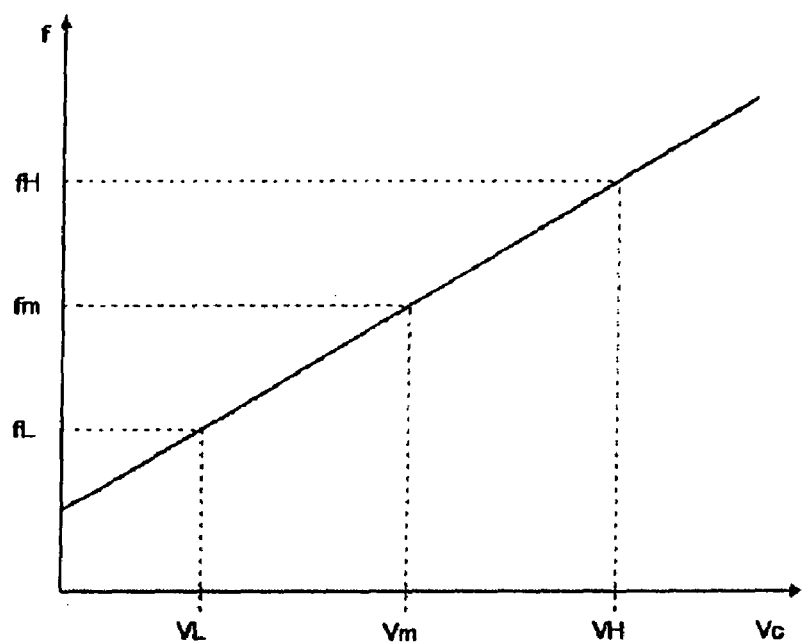
FIG. 3 shows the characteristics of output frequency f with respect to voltage control value Vc in a typical voltage-controlled oscillator.

FIG. 3 shows the characteristics of output frequency f with respect to voltage control value Vc in the oscillator of a typical voltage-controlled oscillator.

As shown in FIG. 3, in a typical voltage-controlled oscillator, output frequency f changes according to the applied voltage control value Vc. In the present embodiment, explanation regards a case in which this voltage control value Vc has been set to initial set value V0 that has been set to realize the frequency that is optimum for the system.

When voltage control value Vc from voltage control circuit 101 is applied to OCVCXO 102, a clock that is frequency-controlled by voltage control value Vc is generated and supplied in OCVCXO 102.

In clock generator 104, this clock is frequency-divided to generate and supply a clock signal, and further, this clock is used in reference generation circuit 104 to generate and supply a reference signal REFn.

Voltage control value Vc is fixed, and the output clock of active-system clock generation circuit 100 is therefore dependent upon the output characteristic of OCVCXO 102.

Figure 4:
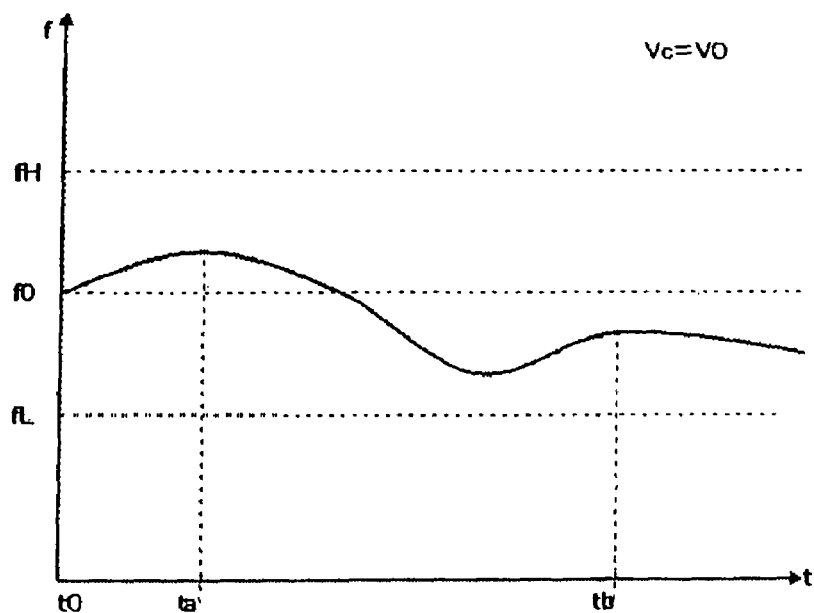
FIG. 4 shows the frequency fluctuation caused by age deterioration in a typical crystal oscillator.

FIG. 4 shows the frequency fluctuation resulting from typical age deterioration of a crystal oscillator.

As shown in FIG. 4 in which the time that the initial set value V0 was set is to and the frequency at that time is f0 in a typical crystal oscillator, fluctuation occurs in the output frequency due to age deterioration. As a result, fluctuation in the output frequency due to age deterioration also occurs in OCVCXO 102 shown in FIG. 1.

Reference signal REFn that is supplied from reference generation circuit 104 is applied as input to synchronizing circuit 201 of standby-system clock generation circuit 200.

In synchronizing circuit 201, phase detection circuit 204 first detects the difference between the received reference signal REFn and a clock obtained by subjecting the output clock of OCVCXO 206 to 1/N frequency division in 1/N frequency divider 207.

This phase difference is applied to CPU 208, and in CPU 208, the value of the control voltage that is to be applied to OCVCXO 206 is determined based on this phase difference and the data of initial set value V0 stored in memory 209. In other words, in CPU 208, to supply the applied phase difference as frequency output, the amount of change in voltage that is to be applied to OCVCXO 206 is calculated, and the value of the control voltage in which the voltage has been changed from initial set value V0 by exactly this amount of change is calculated.

The value of the control voltage that is calculated in CPU 208 is applied to voltage control circuit 205, and in voltage control circuit 205, this value is converted to the control voltage level of OCVCXO 206 and applied to OCVCXO 206.

The synchronized state between the clock signal that is supplied from active-system clock generation circuit 100 and the clock signal that is supplied from standby-system clock generation circuit 200 can be maintained by periodically implementing this series of operations. This configuration is a configuration of known PLL circuit technology, but when the above-described synchronized control is carried out in standby-system clock generation circuit 200 in the present embodiment, the voltage control value that serves as the control voltage that is to be applied to OCVCXO 206 is monitored, and when this voltage control value diverges from a voltage range that has been set to a predetermined voltage range, for example, a range of voltages for realizing the frequency stability that is required by the system, the divergence of the frequency of OCVCXO 102 in active-system clock generation circuit 100 due to, for example, age deterioration is detected, and an operation is carried out to alert the system. As an example, a configuration is adopted for supplying an alert such as an alarm, and when this alarm is detected in the system, control is implemented for switching from the active system to the standby system.

Figure 5:
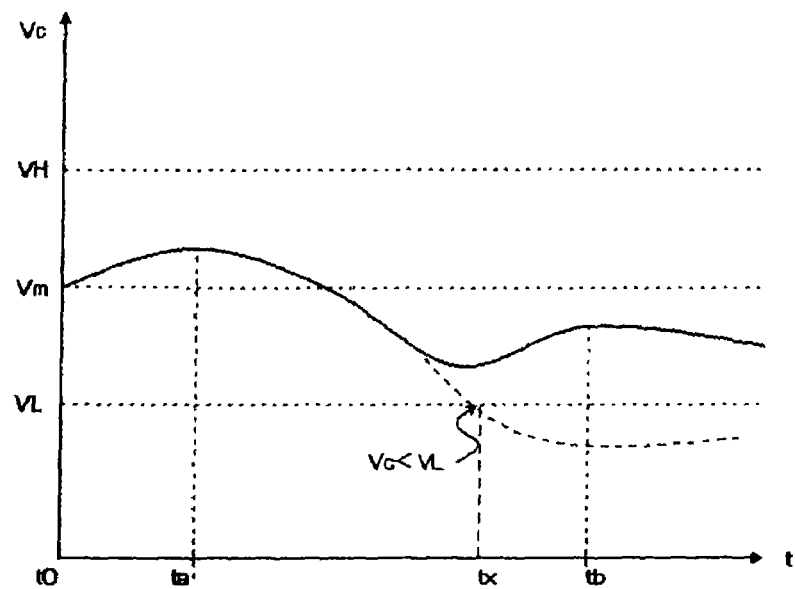
FIG. 5 shows the voltage control value applied to OCVCXO of the standby-system clock generation circuit when the OCVCXO of the active-system clock generation circuit shown in FIG. 1 experiences a frequency fluctuation with the characteristics shown in FIG. 4.
Figure 6:
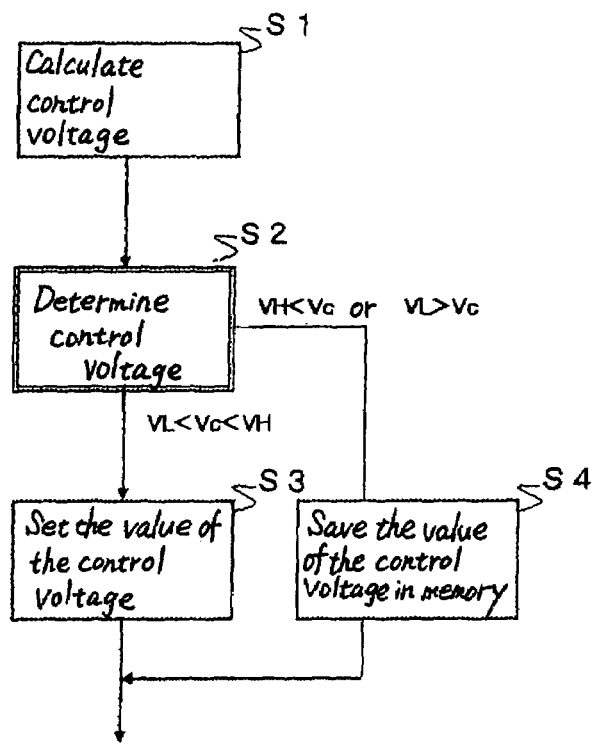
FIG. 6 is a flow chart for explaining the voltage control flow in the standby-system clock generation circuit shown in FIG. 1.

FIG. 5 shows the voltage control value that is applied to OCVCXO 206 of standby-system clock generation circuit 200 when OCVCXO 102 of active-system clock generation circuit 100 shown in FIG. 1 has experienced frequency fluctuation having the characteristics such as shown in FIG. 4. VH and VL in the figure show the maximum value and minimum value, respectively, of the voltage control value that is to be applied to OCVCXO 206 to realize the frequency range that is required in the system. In addition, FIG. 6 is a flow chart for explaining the voltage control flow in standby-system clock generation circuit 200 shown in FIG. 1.

First, in Step S1, CPU 208 of standby-system clock generation circuit 200 calculates voltage control value Vc that serves as the control voltage that is applied to OCVCXO 206 based on the phase difference detected by phase detection circuit 204 and the data of initial set value V0 that is stored in memory 209. CPU 208 next compares the calculated voltage control value Vc with the maximum value VH and minimum value VL of the voltage control value stored in memory 209 in Step S2. In other words, CPU 208 compares the calculated voltage control value Vc with the maximum value VH and minimum value VL of the voltage control value stored in memory 209 to determine whether voltage control value Vc has diverged from the voltage range that is established by the maximum value VH and minimum value VL of voltage control value Vc.

When VL<Vc<VH as shown by the solid line in the figure, i.e., when voltage control value Vc is within the voltage range established by the maximum value VH and minimum value VL, CPU 208 sets this voltage control value Vc as the control voltage and applies the control voltage to voltage control circuit 205 in Step S3.

On the other hand, when VH<Vc or when VL>Vc as in the state in which t=tx and after in the characteristics shown by the broken line in the figure, i.e., when voltage control value Vc has diverged from the voltage range established by the maximum value VH and minimum value VL, CPU 208 stores voltage control value Vc without setting this voltage control value Vc as the control voltage in Step S4. In order to analyze the defects of OCVCXO 102, the characteristics of the frequency fluctuation caused by age deterioration of OCVCXO 102 can later be checked by checking the data that have been stored in memory 209.

The above-described operations enable the detection of the states VH<Vc or VL>Vc, i.e., the detection of the divergence of the system from the permissible frequency range, whereby the occurrence of frequency fluctuation due to, for example, the age deterioration of OCVCXO 102 in active-system clock generation circuit 100 can be determined.

In the above-described embodiment, a monitoring method can also be considered in which the monitored range of VH and VL is limited to approximately one-half the standards of the system, and in which the active system and standby system are switched when this range is exceeded.

Adverse effects upon the system can thus be forestalled by switching to the standby system before the influence of frequency fluctuation in the active system causes divergence from the permissible frequency range of the system.

Second Embodiment

Figure 7:
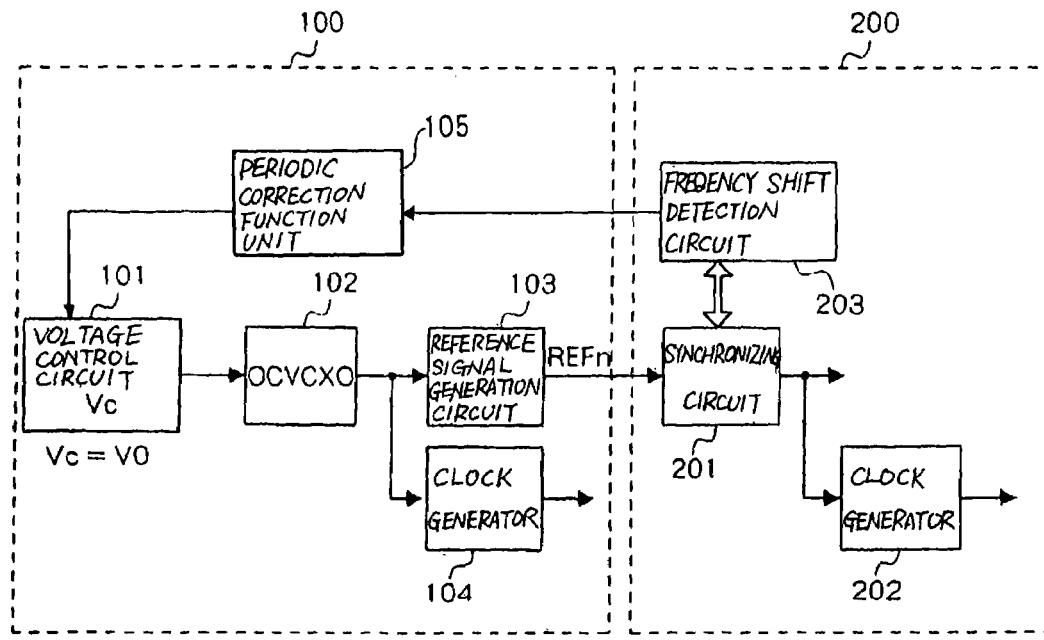
FIG. 7 shows the second embodiment of the clock generation circuit of the present invention.

FIG. 7 shows the second embodiment of the clock generation circuit of the present invention.

As shown in FIG. 7, the present embodiment differs from the circuit shown in FIG. 1 only in that periodic correction function unit 105 is provided in active-system clock generation circuit 100 for automatically performing readjustment of the frequency of OCVCXO 102 when frequency fluctuation occurs in OCVCXO 102.

When voltage control value Vc that is applied to OCVCXO 206 diverges from the predetermined voltage range in the internal CPU 208 (see FIG. 2), frequency shift detection circuit 203 in the present embodiment uses the threshold values that establish this voltage range to calculate the amount of fluctuation of frequency in OCVCXO 102 and reports the calculated amount of change in frequency to periodic correction function unit 105.

Periodic correction function unit 105 calculates the amount of correction of the control voltage that is to be applied to OCVCXO 102 based on the amount of fluctuation in frequency that has been reported from CPU 208.

Voltage control circuit 101 in the present embodiment applies to OCVCXO 102 a control voltage that has been corrected by a correction value calculated in periodic correction function unit 105.

Explanation next regards the method of correcting the frequency fluctuation of active-system clock generation circuit 100 in the clock generation circuit shown in FIG. 7.

Figure 8:
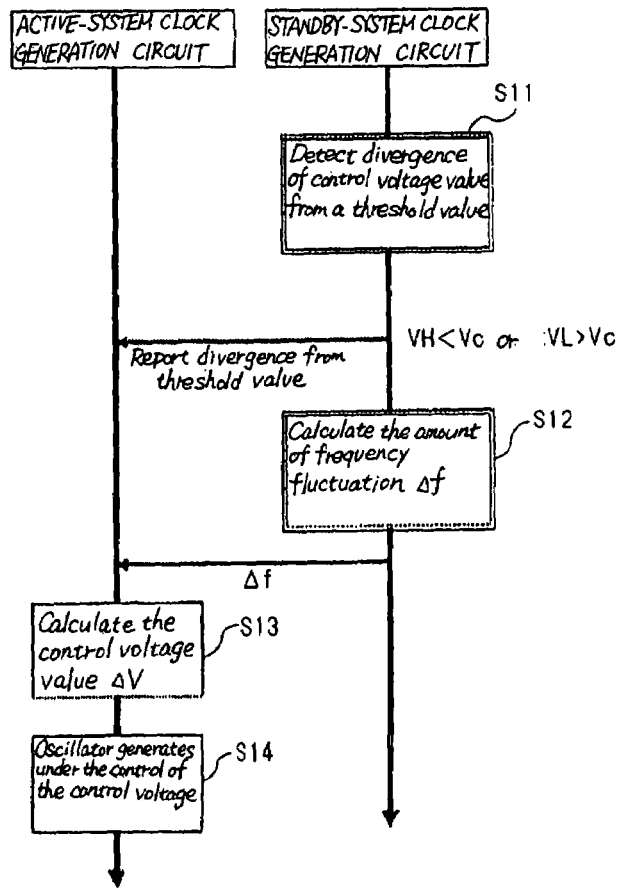
FIG. 8 is a flow chart for explaining the method of correcting the frequency fluctuation of the active-system clock generation circuit in the clock generation circuit shown in FIG. 7.

FIG. 8 is a flow chart for explaining the method of correcting the frequency fluctuation of active-system clock generation circuit 100 in the clock generation circuit shown in FIG. 7.

First, CPU 208 of frequency shift detection circuit 203 of standby-system clock generation circuit 200 calculates voltage control value Vc that serves as the control voltage that is applied to OCVCXO 206 based on the phase difference detected in phase detection circuit 204 and the data of initial set value V0 stored in memory 209. When voltage control value Vc that has been calculated falls below the minimum value VL or rises above the maximum value VH of the voltage control value stored in memory 209 such as in the state when t=tx or later in the characteristics shown by the broken line in FIG. 5, i.e., when voltage control value Vc diverges from the voltage range established by maximum value VH and minimum value VL, CPU 208 detects that a threshold value has been exceeded and reports this occurrence to periodic correction function unit 105 of active-system clock generation circuit 100 in Step S11.

In Step S12, CPU 208 of frequency shift detection circuit 203 calculates the amount of fluctuation in output frequency Δf of OCVCXO 102 based on the values of VL and Vm shown in FIG. 5. CPU 208 then reports the amount of fluctuation of frequency Δf that has been calculated to periodic correction function unit 105 of active-system clock generation circuit.

In Step S13, periodic correction function unit 105 of active-system clock generation circuit 100 calculates the correction value Δv of the control voltage that is to be applied to OCVCXO 102 based on the amount of fluctuation in frequency Δf that was reported from CPU 208. Periodic correction function unit 105 then applies this correction value Δv to voltage control circuit 101.

Voltage control circuit 101 then uses this correction value Δv that has been calculated in periodic correction function unit 105 to correct the control voltage value that is applied to OCVCXO 102 from "V0" to "V0+Δv" and applies the corrected control voltage value V0+Δv to OCVCXO 102. OCVCXO 102 then generates and supplies a clock having a frequency that accords with the control voltage value V0+Δv in Step S14.

The above-described series of operations enables correction according to the amount of Δf of the output frequency of OCVCXO 102 of active-system clock generation circuit 100.

In the present invention as described hereinabove, a configuration is adopted for detecting frequency fluctuation that results from the age deterioration of a first oscillator by monitoring, in a second system that generates a clock signal synchronized to a first system, the value of a control voltage for controlling a second oscillator such that the second system is synchronized with the first system in accordance with the phase difference between the output of a second oscillator and a reference signal that is generated using the output of the first oscillator in the first system, whereby frequency fluctuation that occurs due to age deterioration of the oscillator that serves as the clock source can be detected without carrying out frequency measurements at times of periodic maintenance.

While a preferred embodiment of the present invention has been described using specific terms, such description is for illustrative purposes only, and it is to be understood that changes and variations may be made without departing from the spirit or scope of the following claims.

What is claimed is:

1. A clock generation circuit, comprising:
    a first system comprising a first oscillator controlled by a first control voltage for generating a clock signal according to an output of the first oscillator; and
    a second system comprising a second oscillator controlled by a second control voltage for generating a clock signal synchronized with said first system according to an output of the second oscillator,
    wherein said second system detects an amount of frequency fluctuation in said first oscillator, by monitoring a control voltage value that controls said second oscillator such that said second system is synchronized with said first system, according to a phase difference between a reference signal generated by using the output of said first oscillator and the output of said second oscillator, and
    wherein a correction value of the first control voltage is applied to said first oscillator based on the amount of frequency fluctuation detected in, and reported from, said second system, said amount of frequency fluctuation being reported to said first system independent of the output of said second oscillator.

2. A clock generation circuit according to claim 1, wherein said first system further comprises:
    a first voltage control circuit for applying the first control voltage to said first oscillator;
    a reference signal generator for using the output of said first oscillator to generate said reference signal; and
    a first clock generator for generating a clock signal according to the output of said first oscillator, and
    wherein said second system further comprises:
        a phase detector for detecting the phase difference between the reference signal generated in said reference signal generator and the output of said second oscillator;
        a central processing unit (CPU) for both determining the second control voltage applied to said second oscillator according to the phase difference detected in said phase detector and, when the second control voltage diverges from a predetermined voltage range, reporting this divergence;
        a second voltage control circuit for applying the second control voltage determined in said CPU to said second oscillator; and
        a second clock generator for generating a clock signal according to the output of said second oscillator.

3. A clock generation circuit according to claim 2, wherein:
    said second system includes a memory for storing said predetermined voltage range; and
    said CPU determines whether said second control voltage has diverged from said voltage range by comparing said second control voltage with the predetermined voltage range stored in said memory.

4. A clock generation circuit according to claim 3, wherein said CPU stores the second control voltage in said memory when said second control voltage has diverged from said predetermined voltage range.

5. A clock generation circuit according to claim 2, wherein said second system does not apply the second control voltage to said second oscillator when said second control voltage has diverged from said predetermined voltage range.

6. A clock generation circuit according to claim 2, wherein:
    said CPU, when the second control voltage that is applied to said second oscillator diverges from the predetermined voltage range, uses a threshold value that establishes said predetermined voltage range to calculate the amount of fluctuation of frequency and reports the calculated amount of fluctuation of frequency to said first system;
    said first system includes a periodic correction function unit for calculating the correction value of the first control voltage applied to said first oscillator based on the amount of fluctuation of frequency that was reported from said CPU; and
    said first voltage control circuit applies to said first oscillator the first control voltage that was corrected by the correction value calculated in said periodic correction function unit.

7. A clock generation circuit according to claim 1, wherein said first and second oscillators comprise oven-controlled voltage-controlled crystal oscillators.

8. A clock generation circuit according to claim 3, wherein said second system does not apply the second control voltage to said second oscillator when said second control voltage has diverged from said predetermined voltage range.

9. A clock generation circuit according to claim 4, wherein said second system does not apply the second control voltage to said second oscillator when said second control voltage has diverged from said predetermined voltage range.

10. A clock generation circuit according to claim 3, wherein:
    said CPU, when the second control voltage that is applied to said second oscillator diverges from the predetermined voltage range, uses a threshold value that establishes said predetermined voltage range to calculate the amount of fluctuation of frequency and reports the calculated amount of fluctuation of frequency to said first system;
    said first system includes a periodic correction function unit for calculating the correction value of the first control voltage applied to said first oscillator based on the amount of fluctuation of frequency that was reported from said CPU; and
    said first voltage control circuit applies to said first oscillator the first control voltage that was corrected by the correction value calculated in said periodic correction function unit.

11. A clock generation circuit according to claim 4, wherein:
    said CPU, when the second control voltage that is applied to said second oscillator diverges from the predetermined voltage range, uses a threshold value that establishes said predetermined voltage range to calculate the amount of fluctuation of frequency and reports the calculated amount of fluctuation of frequency to said first system;
    said first system includes a periodic correction function unit for calculating the correction value of the first control voltage applied to said first oscillator based on the amount of fluctuation of frequency that was reported from said CPU; and said first voltage control circuit applies to said first oscillator the first control voltage that was corrected by the correction value calculated in said periodic correction function unit.

12. A clock generation circuit according to claim 5, wherein:

said CPU, when the second control voltage that is applied to said second oscillator diverges from the predetermined voltage range, uses a threshold value that establishes said predetermined voltage range to calculate the amount of fluctuation of frequency and reports the calculated amount of fluctuation of frequency to said first system;

said first system includes a periodic correction function unit for calculating the correction value of the first control voltage applied to said first oscillator based on the amount of fluctuation of frequency that was reported from said CPU; and said first voltage control circuit applies to said first oscillator the first control voltage that was corrected by the correction value calculated in said periodic correction function unit.

13. A clock generation circuit according to claim 2, wherein said first and second oscillators comprise oven-controlled voltage-controlled crystal oscillators.

14. A clock generation circuit according to claim 3, wherein said first and second oscillators comprise oven-controlled voltage-controlled crystal oscillators.

15. A clock generation circuit according to claim 4, wherein said first and second oscillators comprise oven-controlled voltage-controlled crystal oscillators.

16. A clock generation circuit according to claim 5, wherein said first and second oscillators comprise oven-controlled voltage-controlled crystal oscillators.

17. A clock generation circuit according to claim 6, wherein said first and second oscillators comprise oven-controlled voltage-controlled crystal oscillators.

18. A clock generation circuit according to claim 1, wherein said second system further comprises:

a phase detector for detecting the phase difference between the reference signal generated by a reference signal generator and the output of said second oscillator; and a central processing unit (CPU) for both determining the second control voltage applied to said second oscillator according to the phase difference detected in said phase detector and, when the second control voltage diverges from the predetermined voltage range, reporting this divergence to at least one of the first system and another component of the second system different from the CPU.

19. A clock generation circuit according to claim 18, wherein the second system further comprises a memory for storing the predetermined voltage range, wherein the another component is the memory.

20. A clock generation circuit according to claim 19, wherein the CPU determines whether the second control voltage has diverged from the predetermined voltage range by comparing the second control voltage with the predetermined voltage range stored in the memory.

21. A clock generation circuit according to claim 18, wherein the second system does not apply the second control voltage to the second oscillator when the second control voltage has diverged from the predetermined voltage range.

22. A clock generation circuit according to claim 18, wherein the CPU reports the divergence to the first system.

23. A clock generation circuit according to claim 22, wherein the CPU, when the second control voltage that is applied to the second oscillator diverges from the predetermined voltage range, uses a threshold value that establishes the predetermined voltage range to calculate the amount of fluctuation of frequency and reports the calculated amount of fluctuation of frequency to the first system.

24. A clock generation circuit according to claim 23, wherein the first system further comprises a first voltage control circuit for applying the first control voltage to said first oscillator, wherein a periodic correction function unit for calculating the correction value of the first control voltage applied to the first oscillator based on the amount of fluctuation of frequency that was reported from the CPU, and wherein the first voltage control circuit applies to the first oscillator the first control voltage that was corrected by the correction value calculated in the periodic correction function unit.

* * * * *